US011127435B2

(12) United States Patent
Ooyabu et al.

(10) Patent No.: US 11,127,435 B2
(45) Date of Patent: Sep. 21, 2021

(54) WEARABLE CAMERA

(71) Applicant: PANASONIC I-PRO SENSING SOLUTIONS CO., LTD., Fukuoka (JP)

(72) Inventors: Satoru Ooyabu, Fukuoka (JP); Michinori Kishimoto, Fukuoka (JP); Toshihiro Kuroki, Fukuoka (JP)

(73) Assignee: Panasonic I-PRO Sensing Solutions Co., Ltd., Fukuoka (JP)

( * ) Notice: Subject to any disclaimer, the term of this patent is extended or adjusted under 35 U.S.C. 154(b) by 0 days.

(21) Appl. No.: 16/789,932

(22) Filed: Feb. 13, 2020

(65) Prior Publication Data

US 2020/0273497 A1 Aug. 27, 2020

(30) Foreign Application Priority Data

Feb. 21, 2019 (JP) .............................. JP2019-029282

(51) Int. Cl.
| | |
|---|---|
| *G11B 27/34* | (2006.01) |
| *H04R 1/02* | (2006.01) |
| *G10L 25/57* | (2013.01) |
| *H04N 5/77* | (2006.01) |
| *G11B 27/19* | (2006.01) |
| *H04R 3/00* | (2006.01) |
| *G11B 27/10* | (2006.01) |
| *G11B 27/28* | (2006.01) |

(52) U.S. Cl.
CPC .............. *G11B 27/34* (2013.01); *G10L 25/57* (2013.01); *G11B 27/19* (2013.01); *H04N 5/772* (2013.01); *H04R 1/02* (2013.01); *H04R 2499/11* (2013.01)

(58) Field of Classification Search
USPC .................................. 386/223–224, 239–248
See application file for complete search history.

(56) References Cited

U.S. PATENT DOCUMENTS

| | | | | |
|---|---|---|---|---|
| 2012/0275614 | A1* | 11/2012 | Kobayashi ............. | H04R 3/005 |
| | | | | 381/71.5 |
| 2013/0011116 | A1* | 1/2013 | Barrett ................... | G11B 27/28 |
| | | | | 386/230 |
| 2016/0191862 | A1* | 6/2016 | Yokomitsu ............. | H04N 5/232 |
| | | | | 348/158 |
| 2016/0196852 | A1* | 7/2016 | Sievert ............... | G11B 27/3027 |
| | | | | 386/241 |
| 2016/0227173 | A1* | 8/2016 | Yamaguchi ............. | G06F 1/163 |
| 2016/0274621 | A1* | 9/2016 | Meyer ................... | B29C 39/021 |
| 2016/0344924 | A1* | 11/2016 | Tsai ........................ | H04N 7/185 |
| 2016/0351231 | A1* | 12/2016 | Woods .................... | G11B 27/28 |
| 2017/0019580 | A1* | 1/2017 | Boghosian ........... | G11B 27/031 |
| 2017/0127746 | A1* | 5/2017 | Pietrzak ................. | A42B 3/042 |

(Continued)

FOREIGN PATENT DOCUMENTS

JP      2016-181767 A      10/2016

*Primary Examiner* — Hung Q Dang
(74) *Attorney, Agent, or Firm* — Seed IP Law Group LLP

(57) ABSTRACT

A wearable camera includes an imaging unit; a storage unit configured to store video data imaged by the imaging unit; a sound collection unit disposed on an upper surface of a casing of the wearable camera and configured to collect a sound of a user; and a control unit configured to extract a sound of the user related to an imaging situation included in the video data, and add attribute information to the video data based on the extracted sound.

12 Claims, 10 Drawing Sheets

(56) References Cited

U.S. PATENT DOCUMENTS

| | | | |
|---|---|---|---|
| 2018/0013946 A1* | 1/2018 | Bergman | H04R 1/028 |
| 2018/0294012 A1* | 10/2018 | Cai | G11B 20/10527 |
| 2019/0043500 A1* | 2/2019 | Malik | A63F 13/424 |
| 2019/0199998 A1* | 6/2019 | Shen | H04N 13/139 |
| 2020/0041803 A1* | 2/2020 | Reyes | G10L 25/18 |

* cited by examiner

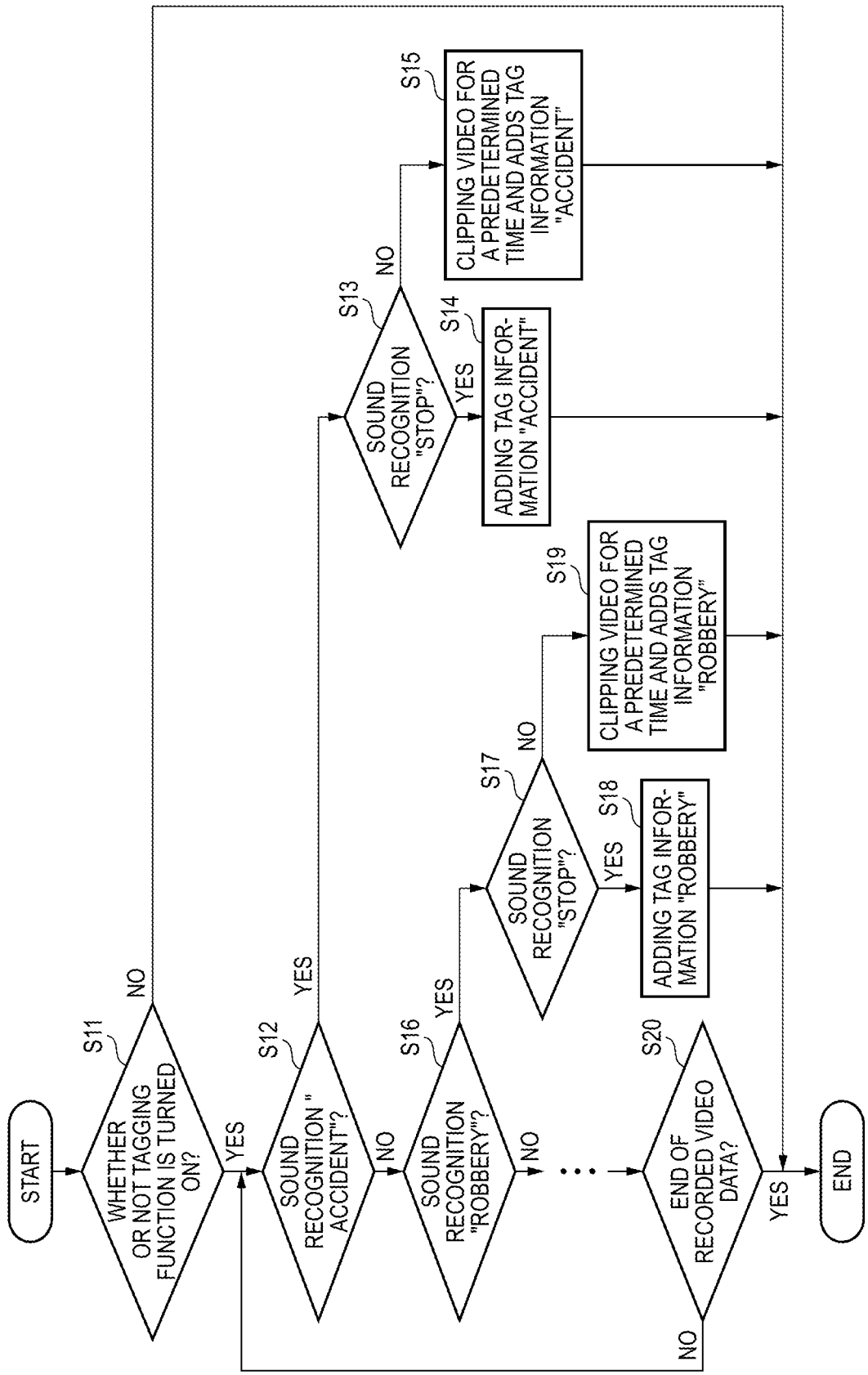

WEARABLE CAMERA

CROSS-REFERENCE TO RELATED APPLICATIONS

This application is based on and claims priority under 35 USC 119 from Japanese Patent Application No. 2019-029282 on Feb. 21, 2019, the contents of which are incorporated herein by reference.

TECHNICAL FIELD

The present disclosure relates to a wearable camera.

BACKGROUND ART

In recent years, wearable cameras have been introduced to support tasks of police officers or security guards (see, for example, Patent Literature 1). Wearable cameras are attached to bodies, or worn clothes of police officers or guards, and image videos of sites or the like.

CITATION LIST

Patent Literature

Patent Literature 1: JP-A-2016-181767

SUMMARY OF INVENTION

A wearable camera is generally set to have a wide angle of view so that a wide range of videos can be imaged. Therefore, when the wearable camera performs the authentication processing by using the imaged video, there is a problem that imaging objects to be subjected the authentication processing is imaged in a small size and the authentication accuracy is reduced.

Non-limiting examples of the present disclosure contribute to the provision of a wearable camera that can improve the authentication accuracy of imaging objects.

In addition, for example, a police officer may reproduce a video imaged (recorded) by a wearable camera on a terminal device, and create a report on a case based on the reproduced video. The video data may include, for example, a video portion not related to a case (report). If the video related to the case can be immediately reproduced by the terminal device, the report can be easily created.

Therefore, for example, it is conceivable that the wearable camera adds attribute information to video data based on the sound of a police officer attached with the wearable camera such that the video portion related to the case can be reproduced by the terminal device. For example, the wearable camera adds tag information to the video data from the sound of "case" emitted by the police officer to the sound of "stop" included in the video data. In this case, the terminal device can reproduce the video from the sound "case" to the sound "stop" based on the tag information added to the video data.

As described above, when the wearable camera adds the tag information based on the sound of the user attached with the wearable camera, it is desired to add the attribute information to the video data based on the sound of the user attached with the wearable camera instead of the sound of the other person.

Non-limiting examples of the present disclosure contribute to the provision of a wearable camera that can appropriately add attribute information to video data based on a sound of a user attached with the wearable camera.

A wearable camera according to an aspect of the present disclosure includes an imaging unit capable of switching between a first angle of view and a second angle of view narrower than the first angle of view, and a control unit configured to switch the angle of view to the second angle of view when a predetermined operation is accepted during imaging at the first angle of view and execute authentication processing of an object imaged at the second angle of view.

The wearable camera according to an aspect of the present disclosure includes an imaging unit, a storage unit that stores video data imaged by the imaging unit, a sound collection unit that is disposed on an upper surface of a casing of the wearable camera and collects a sound of a user, and a control unit that extracts the sound of the user related to a video situation included in the video data, and adds attribute information to the video data based on the extracted sound.

Also, these general or specific aspects may be realized by a system, an apparatus, a method, an integrated circuit, a computer program, or a recording medium. Further, these general or specific aspects may be realized by any combination of a system, an apparatus, a method, an integrated circuit, a computer program, and a recording medium.

According to an aspect of the present disclosure, it is possible to improve the authentication accuracy of the imaging object or to appropriately add the attribute information to the video data based on the sound of the user attached with the wearable camera.

Additional advantages and effects of one aspect of the disclosure will be made apparent from the description and drawings. Such advantages and/or effects may be provided by some embodiments and the features described in the description and drawings, respectively, but not all may be provided to obtain one or more of the same features.

BRIEF DESCRIPTION OF DRAWINGS

FIG. 11 is a flowchart showing an operation example of a wearable camera.

DESCRIPTION OF EMBODIMENTS

Hereinafter, embodiments of the present invention will be described in detail with reference to the drawings. However, unnecessarily detailed description may be omitted. For example, a detailed description of a well-known matter or a repeated description of substantially the same configuration may be omitted. This is to prevent the following description from being unnecessarily redundant and to facilitate understanding by those skilled in the art.

It should be noted that the accompanying drawings and the following description are provided for a thorough understanding of the present disclosure by those skilled in the art, and are not intended to limit the subject matter recited in the claims.

First Embodiment

Figure 1:
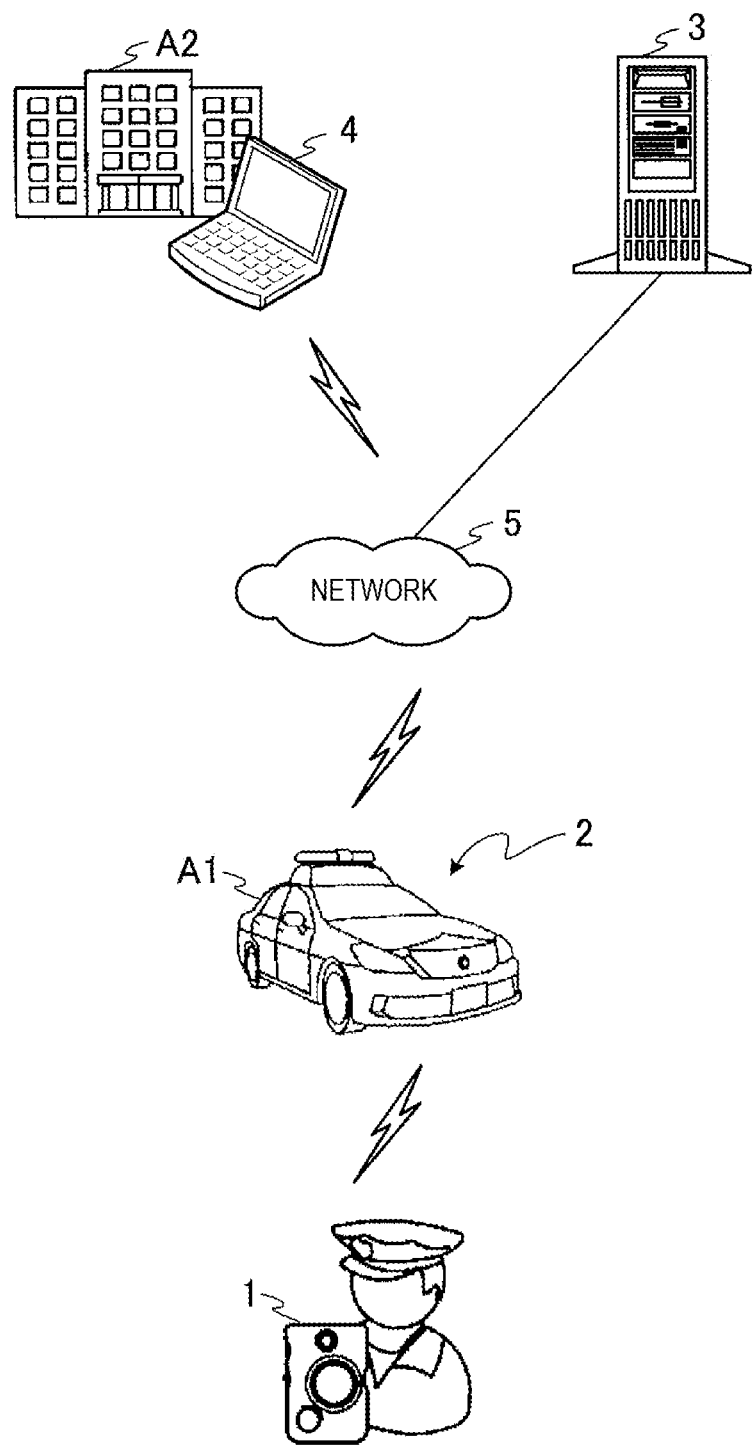
FIG. 1 is a view showing a configuration example of a wearable camera system according to a first embodiment.

FIG. 1 is a view showing a configuration example of a wearable camera system according to a first embodiment. As shown in FIG. 1, the wearable camera system includes a wearable camera 1, an in-vehicle system 2, a server 3, and a terminal device 4.

The in-vehicle system 2, the server 3, and the terminal device 4 are connected via a network 5. The wearable camera 1 is connected to the server 3 and the terminal device 4 via the in-vehicle system 2 and the network 5. The network 5 may include, for example, a wireless communication network such as a mobile phone and a network such as the Internet.

Figure 2:
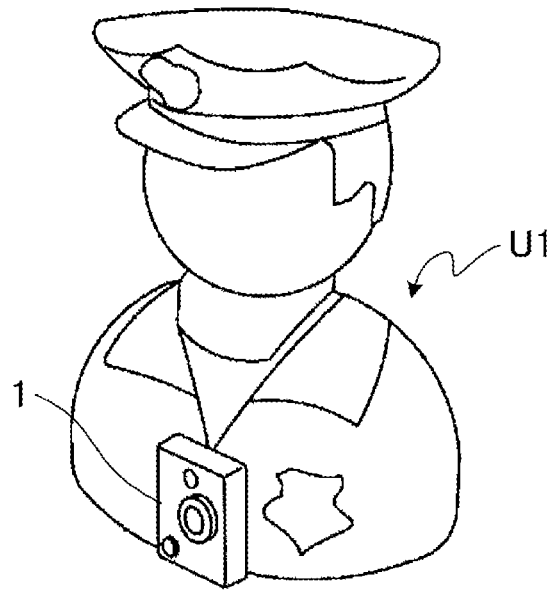
FIG. 2 is a view showing an example of the upper body of a police officer attached with a wearable camera.

The wearable camera 1 is attached or carried by, for example, a police officer (see, for example, FIG. 2). The wearable camera 1 communicates with the in-vehicle system 2 by short-range wireless communication such as Wi-Fi (registered trademark) or Bluetooth (registered trademark).

The in-vehicle system 2 is mounted on, for example, a police vehicle A1. The in-vehicle system 2 includes, for example, an in-vehicle camera (not shown), a control device (not shown) such as a personal computer, and a communication device (not shown).

The in-vehicle system 2 receives, for example, video data captured by the wearable camera 1 from the wearable camera 1. The in-vehicle system 2 transmits the video data received from the wearable camera 1 to the server 3 via the network 5. The in-vehicle system 2 transmits the video data captured by the in-vehicle camera to the server 3 via the network 5.

The server 3 stores the video data captured by the wearable camera 1 and the video data captured by the in-vehicle camera of the in-vehicle system 2. In addition, the server 3 stores a report or the like created by the terminal device 4.

The terminal device 4 is used by, for example, a police officer at a police station A2. The terminal device 4 accesses the server 3 in response to the operation of the police officer, and displays the video data stored in the server 3 on a display device. Further, the terminal device 4 creates, for example, a report related to a case or the like in response to an operation of a police officer. The terminal device 4 transmits the created report to the server 3 via the network 5.

The wearable camera 1 is connected to the server 3 and the terminal device 4 via the in-vehicle system 2 and the network 5, but the present invention is not limited thereto. The wearable camera 1 may be connected to the server 3 and terminal device 4 via network 5 without passing through the in-vehicle system 2.

FIG. 2 is a view showing an example of the upper body of a police officer U1 attached with the wearable camera 1. In FIG. 2, the same components as those in FIG. 1 are denoted by the same reference numerals.

The wearable camera 1 is attached to or held on the front portion of the uniform of the police officer U1 so as to image the front of the police officer U1 as a user. The wearable camera 1 may be fixed to the front portion of the uniform, for example, in a state in which the wearable camera 1 is suspended from the neck by a string. The wearable camera 1 may be fixed to the front portion of the uniform by engaging an attaching device (for example, an attachment clip) attached to the rear surface of the casing of the wearable camera 1 and an attached device attached to the front portion of the uniform.

Figure 3:
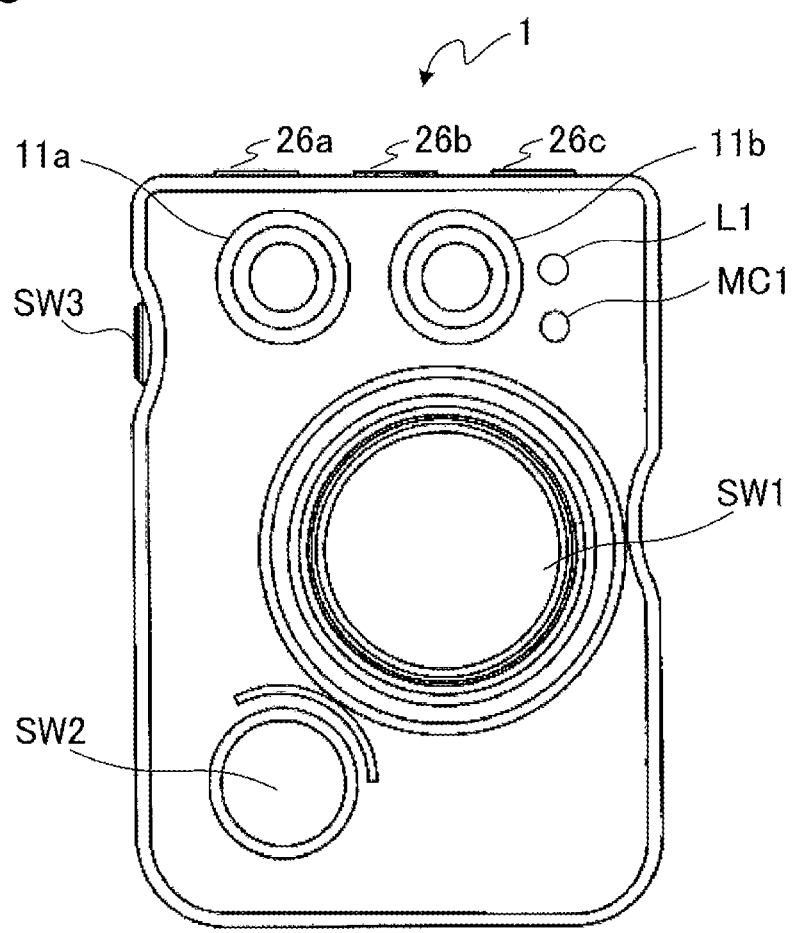
FIG. 3 is a view showing an appearance example of a wearable camera.

FIG. 3 is a view showing an appearance example of the wearable camera 1. As shown in FIG. 3, camera lenses 11a, 11b, a laser L1, a microphone MC1, and switches SW1, SW2 are disposed in front of a casing of the wearable camera 1. A switch SW3 is disposed on the side surface of the casing of the wearable camera 1. Light emitting diodes (LEDs) 26a to 26c and a display device (not shown) for displaying a video imaged by the wearable camera 1 are disposed on the upper surface of the casing of the wearable camera.

The angle of view of the camera lens 11a is wider than the angle of view of the camera lens 11b. The wearable camera 1 switches imaging by the camera lens 11a and the camera lens 11b in response to the operation of police officer.

Figure 4:
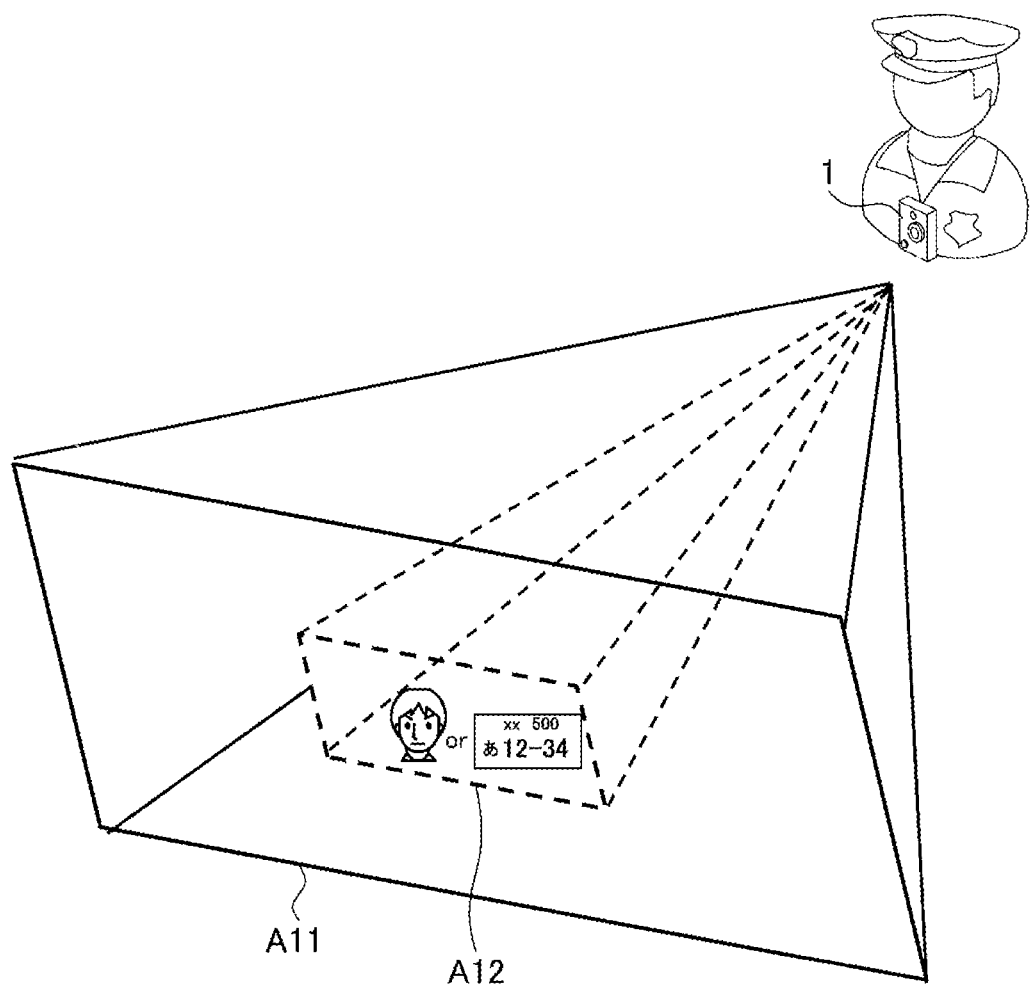
FIG. 4 is a view for explaining an angle of view of a wearable camera.

FIG. 4 is a view for explaining an angle of view of the wearable camera 1. An angle of view A11 indicated by a solid line in FIG. 4 indicates an angle of view by the camera lens 11a. An angle of view A12 indicated by a dotted line in FIG. 4 indicates an angle of view by the camera lens 11b. The angle of view A12 is narrower than the angle of view A11.

The wearable camera 1 switches the angle of view according to the operation of police officer. For example, the wearable camera 1 normally images a video (at a wide angle) through the camera lens 11a. The police officer presses the switch SW3 (see FIG. 2) of the wearable camera 1 when using the wearable camera 1 to perform, for example, face authentication or vehicle license plate authentication. The wearable camera 1 images a video (at a narrow angle) through the camera lens 11b when the switch SW3 is pressed.

That is, the wearable camera 1 normally images a video at a wide angle as shown in the angle of view A11 in FIG. 4. Thus, the wearable camera 1 can image, for example, a situation or the like in a case or patrol in a wide range.

On the other hand, the wearable camera 1 images a video at a narrow angle as indicated by the angle of view A12 in FIG. 4 in response to the operation of police officer when performing authentication such as face authentication or vehicle license plate authentication. The wearable camera 1 can thereby image a large amount of videos of the authentication object, and can appropriately perform the authentication processing.

As described above, the display device is disposed on the upper surface of the casing of the wearable camera 1. Videos captured through the camera lenses 11a, 11b are displayed on the display device. As a result, the police officer can confirm what kind of video is being imaged by the wearable camera 1.

Hereinafter, an operation state in which the wearable camera 1 is imaging a video at a wide angle may be referred to as a wide-angle mode. An operation state in which wearable camera 1 is imaging a video at a narrow angle may be referred to as a narrow-angle mode. The angle of view in the wide-angle mode may be referred to as a first angle of view. The angle of view in the narrow-angle mode may be referred to as a second angle of view.

FIG. 3 will be further described. As will be described later, the laser L1 outputs a laser beam indicating an imaging range (angle of view) at the time of imaging at a narrow angle (see, for example, a laser beam A21 indicated by a solid line in FIG. 6). This makes it easier for police officers to match the aim of the wearable camera 1 to an authentication object (an imaging object to be authenticated by the police officer) at the time of imaging at a narrow angle. It should be noted that the laser L1 does not output a laser beam during imaging at the wide-angle mode.

A microphone MC1 collects the sound emitted by the police officer and the surrounding sound.

A switch SW1 is a button switch that receives an operation of start/stop imaging (video recording) in the wearable camera 1. For example, the wearable camera 1 starts imaging a video in the wide-angle mode when the switch SW1 is pressed once. The wearable camera 1 stops imaging a video when the switch SW1 is subsequently pressed once. The wearable camera 1 starts imaging a video in the wide-angle mode when the switch SW1 is further pressed once.

A switch SW2 is a button switch for accepting an imaging operation of a still image in the wearable camera 1. For example, the wearable camera 1 images a still image every time the switch SW2 is pressed once.

A switch SW3 is a button switch that receives an operation of switching the angle of view in the wearable camera 1. For example, the wearable camera 1 switches the angle of view each time the switch SW3 is pressed once. More specifically, the wearable camera 1 switches the angle of view to a narrow angle when the switch SW3 is pressed once. The wearable camera 1 switches the angle of view to the wide angle when the switch SW3 is subsequently pressed once. The wearable camera 1 further switches the angle of view to a narrow angle when the switch SW3 is further pressed once.

The LEDs 26a to 26c indicate the operation state of the wearable camera 1 depending on the lighting state. For example, the LEDs 26a to 26c indicate whether or not the wearable camera 1 is recording depending on the lighting state. The LEDs 26a to 26c indicate whether the angle of view of the wearable camera 1 is wide or narrow depending on the lighting state.

Figure 5:
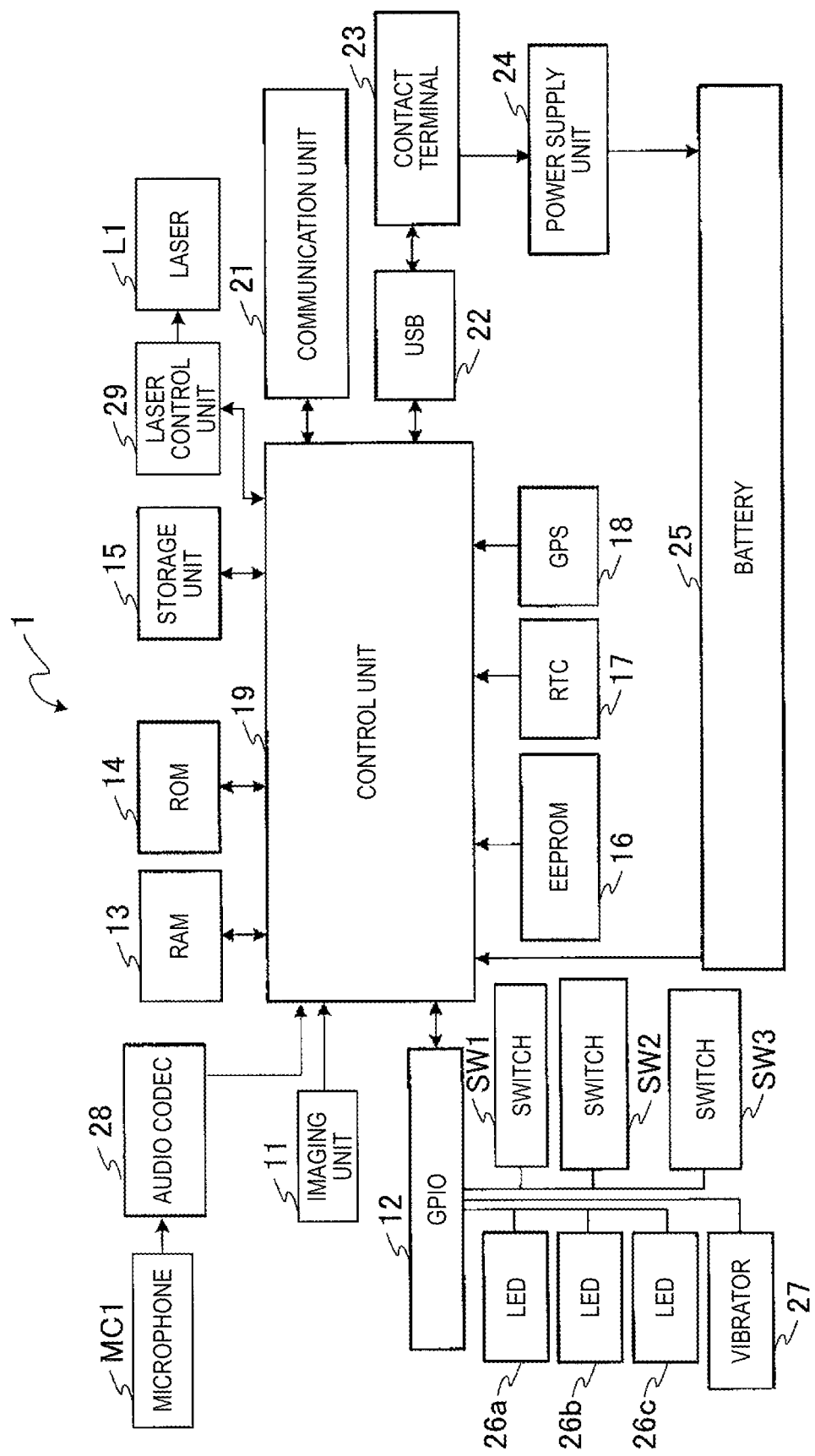
FIG. 5 is a view showing a block configuration example of the wearable camera in FIG. 3.

FIG. 5 is a view showing a block configuration example of the wearable camera 1 in FIG. 3. As shown in FIG. 5, the wearable camera 1 includes an imaging unit 11, a general purpose input/output (GPIO) 12, a random access memory (RAM) 13, a read only memory (ROM) 14, a storage unit 15, an electrically erasable programmable read-only memory (EEPROM) 16, an RTC (Real Time Clock) 17, a global positioning system (GPS) 18, a control unit 19, a communication unit 21, a universal serial bus (USB) 22, a contact terminal 23, a power supply unit 24, a battery 25, LEDs 26a, 26b, 26c, a vibrator 27, an audio codec 28, switches SW1 to SW3, a microphone MC1, and a laser L1.

The capture unit 11 includes camera lenses 11a, 11b (see FIG. 3) and two individual imaging sensors (not shown). One individual imaging sensor converts the light received through the camera lens 11a into an electric signal. The other individual imaging sensor converts the light received through the camera lens 11b into an electric signal. The imaging unit 11 outputs one electrical signal (video data) of the two individual imaging sensors to the control unit 19 according to the control of the control unit 19. That is, the imaging unit 11 can switch the angle of view according to the control of the control unit 19.

The GPIO 12 is an interface for serial/parallel conversion. The GPIO 12 inputs and outputs signals between the switches SW1 to SW3, the LEDs 26a to 26c, and the vibrator 27 and the control unit 19.

The RAM 13 is a work memory used in the operation of the control unit 19.

The ROM 14 is a memory that stores programs and data for controlling the control unit 19 in advance.

The storage unit 15 is, for example, an external storage medium such as an SD memory. The storage unit 15 stores video data imaged and obtained by the imaging unit 11. The storage unit 15 is attachable to and detachable from a casing body of the wearable camera 1.

The EEPROM 16 stores identification information (for example, a camera 1D) for identifying the wearable camera 1 and other setting information.

The RTC 17 counts current time information and outputs the information to the control unit 19.

The GPS 18 receives a GPS signal transmitted from a GPS transmitter and calculates current position information of the wearable camera 1. The GPS 18 outputs the calculated position information to the control unit 19.

The control unit 19 operates according to a program and data stored in the ROM 14, and controls the entire wearable camera 1. For example, the control unit 19 performs input/output data processing with each unit, data calculation processing, and data storage processing. The control unit 19 may be configured by, for example, a central processing unit (CPU) or a digital signal processor (DSP).

The communication unit 21 connects the control unit 19 and the network 5 in a physical layer that is a first layer of an open systems interconnection (OSI) reference model, for example.

The USB 22 enables connection with the in-vehicle system 2, for example. The USB 22 enables connection with the terminal device 4 in the police station A2, for example.

The contact terminal 23 is a terminal electrically connected to a cradle (not shown) or an external adapter (not shown) or the like. The contact terminal 23 is connected to the control unit 19 via the USB 22, and is connected to the power supply unit 24. The wearable camera 1 can be charged via a cradle or adapter, or can communicate with an external device.

The power supply unit 24 supplies power supplied from the cradle or the external adapter to the battery 25 via the contact terminal 23.

The battery 25 is configured by a rechargeable secondary battery, and supplies power to each unit of the wearable camera 1.

The switch SW1 is a button switch that receives an operation to start/stop imaging of wearable camera 1. The switch SW2 is a button switch for accepting an imaging operation of a still image in the wearable camera 1. The switch SW3 is a button switch that receives an operation of switching the angle of view in the wearable camera 1.

The LEDs 26a to 26c indicate the operation state of the wearable camera 1 depending on the lighting state. The vibrator 27 indicates an operation state of the wearable camera 1 by vibration.

The microphone MC1 collects the sound emitted by the police officer attached with the wearable camera 1 and the surrounding sounds, and outputs an audio signal obtained by the collected sounds to the audio codec 28. The audio codec 28 encodes (compresses) the audio signal and outputs the encoded audio signal to the control unit 19.

The laser control unit 29 controls the output of the laser L1 in response to an instruction from the control unit 19.

Figure 6:
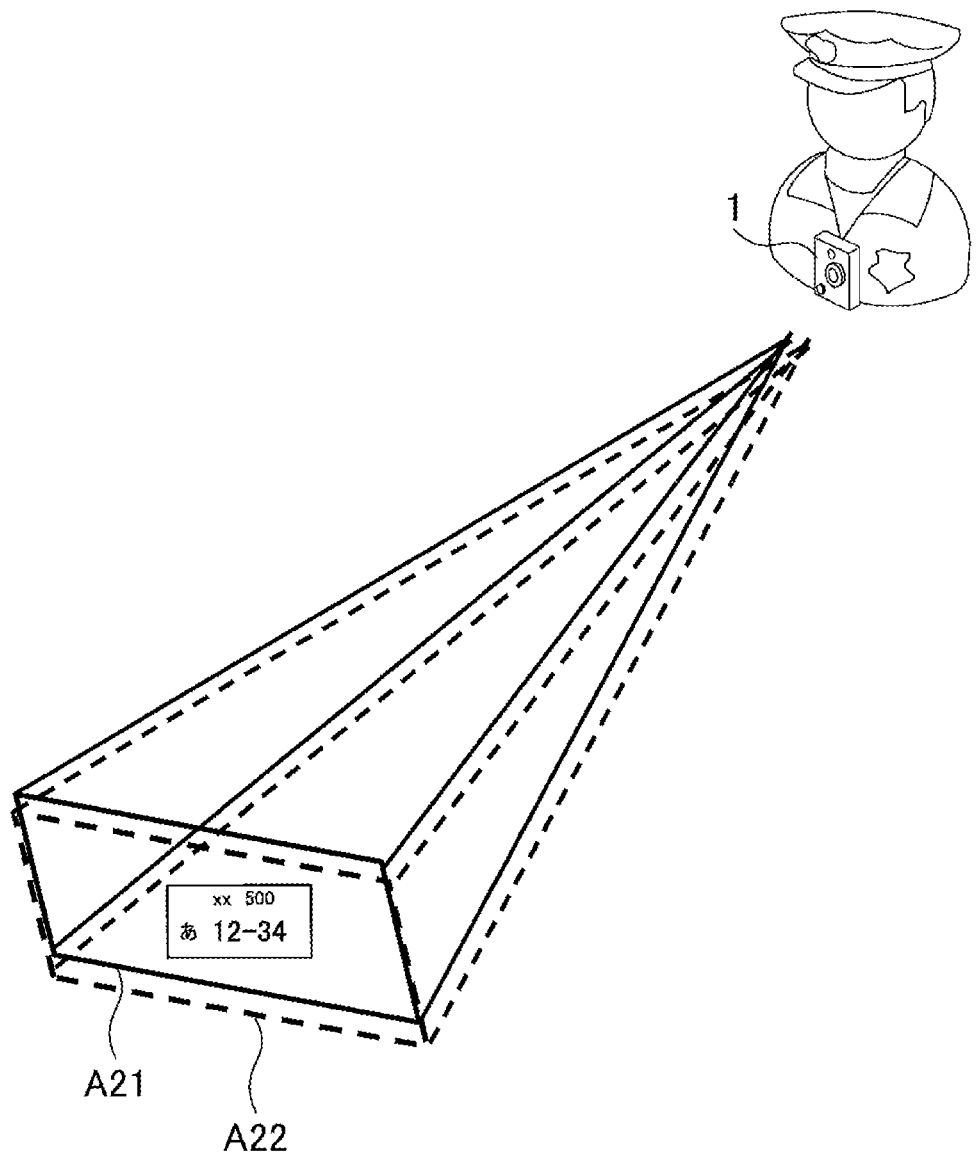
FIG. 6 is a view for explaining laser output of a wearable camera.

FIG. 6 is a view for explaining a laser output of the wearable camera 1. The laser beam A21 indicated by solid lines shown in FIG. 6 shows a laser beam output from the laser L1 of the wearable camera 1. The angle of view A22 indicated by dotted lines shown in FIG. 6 shows the angle of view of the wearable camera 1 in the narrow-angle mode.

It is assumed that a police officer attached with the wearable camera 1 presses the switch SW1 to image in the wide-angle mode. The police officer, for example, finds a suspicious vehicle and checks the license plate. The police officer presses the switch SW3 to change the imaging mode of the wearable camera 1 from the wide-angle mode to the narrow-angle mode. When the imaging mode is set to the narrow-angle mode, the control unit 19 of the wearable camera 1 outputs a laser beam from the laser L1.

As shown by the laser beam A21 in FIG. 6, the laser L1 of the wearable camera 1 outputs a laser beam that matches (substantially matches) the angle of view of the wearable camera 1. For example, the laser L1 outputs a linear laser beam indicating the range of the angle of view of the wearable camera 1. More specifically, a quadrangular frame-shaped laser beam indicating the edge of the angle of view of the wearable camera 1 is output.

Accordingly, when imaging (collating) the license plate of the vehicle, the police officer may direct the wearable camera 1 such that the license plate is contained in the frame-shaped laser beam. Further, when imaging the license plate of the vehicle, the police officer may move back and forth such that the license plate is contained in the frame-like laser beam.

When the license plate falls within the angle of view in the narrow-angle mode, the control unit 19 of the wearable camera 1 reads the number of the license plate from the video. The RAM 13, the storage unit 15, or the EEPROM 16 of the wearable camera 1 stores, for example, a license plate of a vehicle such as a stolen vehicle or a suspect. The control unit 19 of the wearable camera 1 collates a license plate read from the video with the license plate stored in the RAM 13, the storage unit 15, or the EEPROM 16 (hereinafter, sometimes referred to as an authentication information storage unit) of the wearable camera 1.

When the license plate read from the video and the license plate stored in the authentication information storage unit match, the control unit 19 of the wearable camera 1 notifies the police officer of the coincidence by lighting of the LEDs 26a to 26c. Alternatively, when the license plate read from the video and the license plate stored in the authentication information storage unit match, the control unit 19 of the wearable camera 1 notifies the police officer of the coincidence by the vibration of the vibrator 27. Alternatively, when the license plate read from the video and the license plate stored in the authentication information storage unit match, the control unit 19 of the wearable camera 1 displays information indicating that the license plates match on the display device disposed on the upper surface of the wearable camera 1.

The license plate of the vehicle such as a stolen vehicle or a suspect is transmitted from the server 3 or the terminal device 4, for example. The license plate transmitted from the server 3 or the terminal device 4 is received by the wearable camera 1 via the network 5 and the in-vehicle system 2. The wearable camera 1 stores the received license plate in one of the RAM 13, the storage unit 15, or the EEPROM 16.

The collation of the license plate of the vehicle has been described in FIG. 6, and the same applies to the face authentication.

Figure 7:
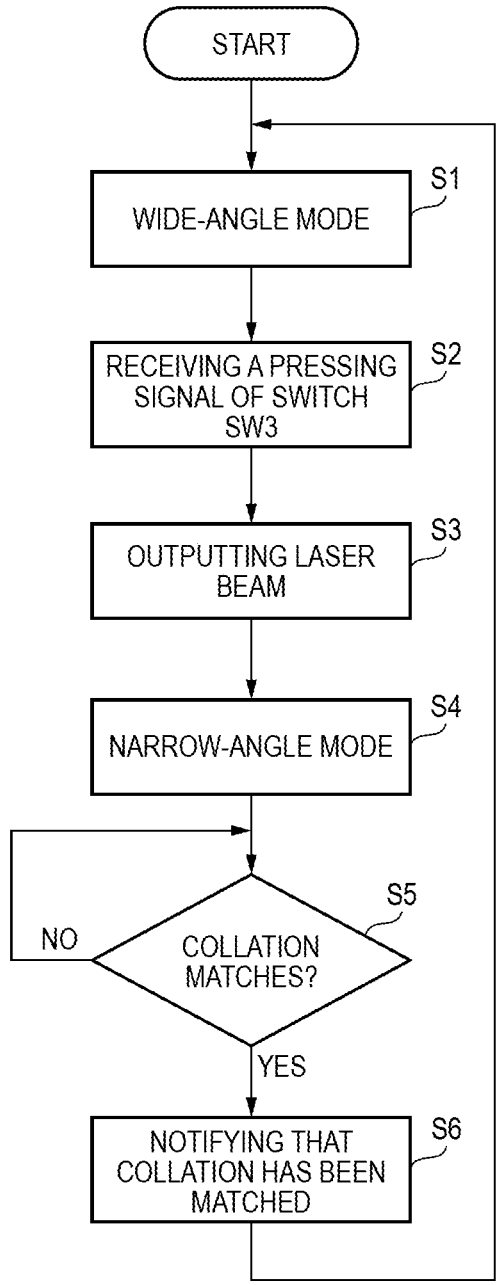
FIG. 7 is a flowchart showing an operation example of a wearable camera.

FIG. 7 is a flowchart showing an operation example of the wearable camera 1. It is assumed that the police officer attached with the wearable camera 1 starts patrol, and presses the switch SW1 of the wearable camera 1, for example.

The control unit 19 of the wearable camera 1 controls the imaging unit 11 in response to the press-down of the switch SW1, and performs imaging at the wide-angle mode (step S1).

Here, for example, it is assumed that the police officer has found a suspicious vehicle or a suspicious person. The police officer presses the switch SW3 to match the suspicious vehicle or the suspicious person.

The control unit 19 of the wearable camera 1 receives a signal indicating that the switch SW3 has been pressed (step S2).

In response to the reception of the signal in the step S2, the control unit 19 of the wearable camera 1 controls the laser control unit 29 to output a laser beam from the laser L1 (step S3).

The control unit 19 of the wearable camera 1 controls the imaging unit 11 in response to the reception of the signal in step S2, and performs imaging in the narrow-angle mode (step S4). That is, when the operation of the switch SW3 is received while the first angle of view is being imaged, the control unit 19 of the wearable camera 1 switches to the second angle of view.

When the imaging mode is switched to the narrow-angle mode, the police officer focuses the wearable camera 1 such that the authentication object falls within the frame of the laser beam of the laser L1.

The control unit 19 of the wearable camera 1 collates the authentication object contained in the frame of the laser beam with the information stored in the authentication information storage unit (information such as face data or license plate of the authentication person) (step S5).

When the collation matches ("Yes" in S5), for example, the control unit 19 of the wearable camera 1 turns on LDEs 26a to 26c, and notifies the police officer that the collation has been matched (step S6). Then, the wearable camera 1 shifts the processing to step S1, and performs imaging in the wide-angle mode. Accordingly, the police officer can restart imaging the authentication object whose collation has been matched and the landscape and the situation around the object without operating the wearable camera 1.

On the other hand, when the collation does not match ("No" in S 5), the control unit 19 of the wearable camera 1 continues the collation processing. Accordingly, the police officer can continuously perform collation of another authentication object without operating the wearable camera 1. For example, when a plurality of suspicious vehicles are parked in a certain field, the police officer can continuously check the license plates of the plurality of suspicious vehicles.

As described above, the wearable camera 1 includes the imaging unit 11 capable of switching between a first angle of view and a second angle of view narrower than a first angle of view, and the control unit 19 configured to switch the angle of view to the second angle of view when a predetermined operation is accepted during imaging at the first angle of view and execute an authentication processing of an authentication object imaged at the second angle of view. As a result, the wearable camera 1 images the authentication object at a narrow angle of view when performing the authentication processing, so that the authentication accuracy of the authentication object can be improved.

(Modification 1)

The control unit 19 of the wearable camera 1 may output a laser beam from the laser L1 in the wide-angle mode. The control unit 19 of the wearable camera 1 may execute the authentication processing in the wide-angle mode.

Figure 8:
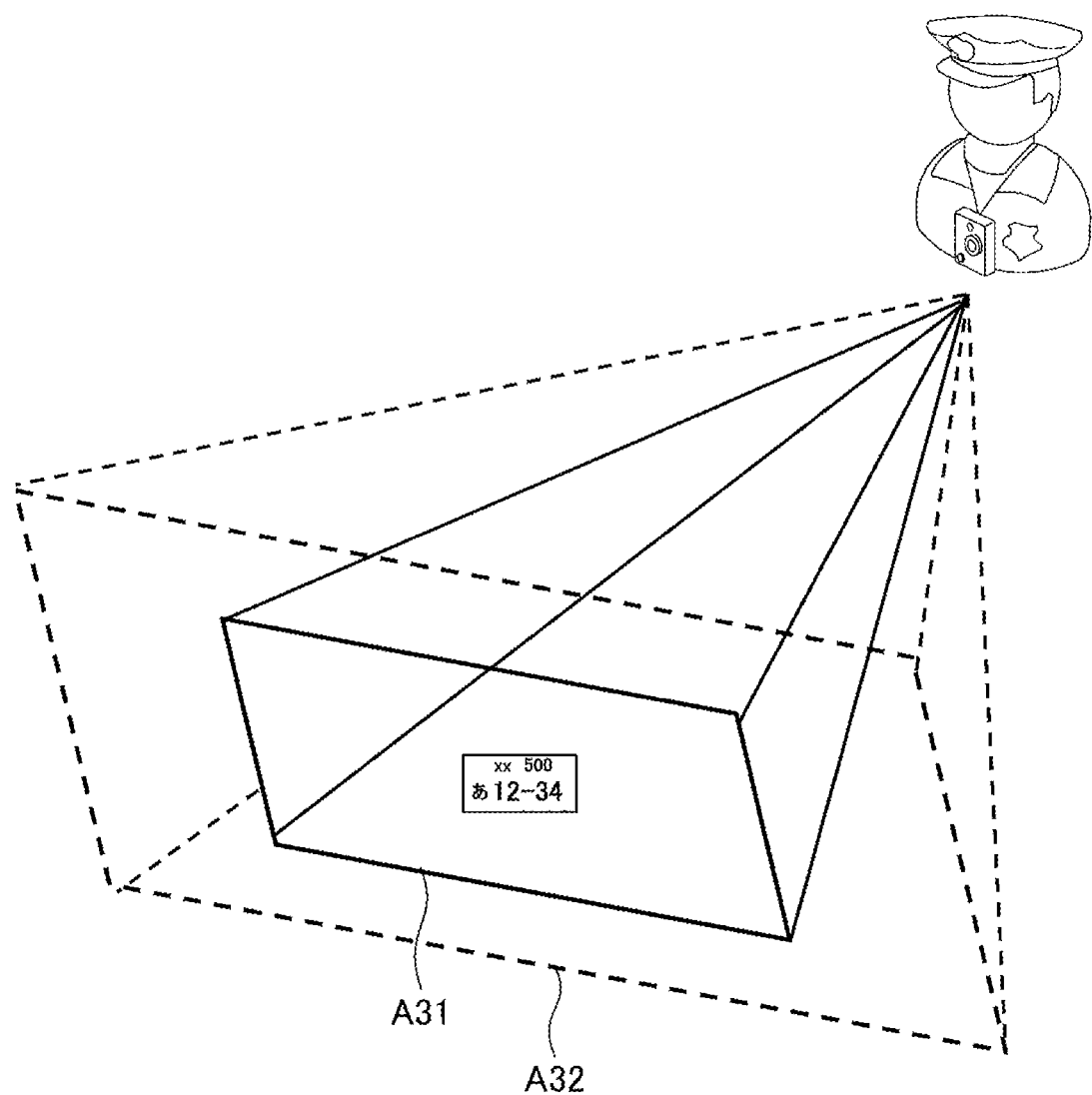
FIG. 8 is a view for explaining authentication processing in the wide-angle mode.

FIG. 8 is a view for explaining the authentication processing in the wide-angle mode. The laser beam A31 indicated by solid lines shown in FIG. 8 shows a laser beam output from the laser L1 of the wearable camera 1 in the wide-angle mode. The angle of view A32 indicated by dotted lines shown in FIG. 6 shows the angle of view of the wearable camera 1 in the narrow-angle mode.

As shown in FIG. 8, the laser L1 of the wearable camera 1 outputs a laser beam indicating a range in which the authentication processing can be performed in the wide-angle mode. For example, the laser L1 outputs a linear laser beam indicating a range in which the control unit 19 of the wearable camera 1 can perform the authentication processing. More specifically, the laser L1 outputs a quadrangular frame-shaped laser beam indicating an edge of a range that can be authenticated by the control unit 19 of the wearable camera 1.

When imaging (collating) a license plate of a vehicle, the police officer may direct the wearable camera 1 such that the number plate fits within the frame-shaped laser beam. Further, when imaging the license plate of the vehicle, the police officer may move back and forth such that the license plate is contained in the frame-like laser beam.

As a result, the control unit 19 of the wearable camera 1 can execute the number plate authentication processing that fits within the laser beam A31 in FIG. 8.

The wearable camera 1 may include, for example, a switch for outputting a laser beam in the wide-angle mode on the side surface of the casing. For example, when the switch provided on the side surface of the casing is pressed in the wide-angle mode, the control unit 19 of the wearable camera 1 may output the laser beam A31 shown in FIG. 8.

The collation of the license plate of the vehicle has been described in FIG. 8, and the same applies to the face authentication.

(Modification 2)

In the above description, when the mode shifts to the narrow-angle mode, the control unit 19 of the wearable camera 1 stops imaging (recording) by the wide angle, but is not limited thereto. Even when the mode shifts to the narrow-angle mode, the control unit 19 of the wearable camera 1 may continue imaging by the wide angle (imaging by the camera lens 11a). The control unit 19 of the wearable camera 1 may also record video data in the narrow-angle mode when the imaging is continued by the wide angle even when the mode is shifted to the narrow-angle mode.

(Modification 3)

The control unit 19 of the wearable camera 1 continues the collation processing when the collation does not match in the step S5 in FIG. 7, but the present invention is not limited thereto. The control unit 19 of the wearable camera 1 may shift to the wide-angle mode of the step S1 when the collation does not match even after a predetermined time (for example, 10 seconds).

When the switch SW3 is pressed, the control unit 19 of the wearable camera 1 may shift to the wide-angle mode. When the switch SW3 is pressed again, the control unit 19 of the wearable camera 1 may shift to the narrow-angle mode. That is, the control unit 19 of the wearable camera 1 may switch between the wide-angle mode and the narrow angle mode each time the switch SW3 is pressed.

(Modification 4)

In the above description, the two camera lenses 11a, 11b are provided, but the present invention is not limited thereto. The wearable camera 1 may include, for example, an imaging unit including one zoom lens (optical zoom lens) and one individual image sensor. The control unit 19 of the wearable camera 1 may control the zoom lens to change the angle of view.

(Modification 5)

Depending on the situation, the output of the laser beam may be desired to be stopped. For example, there may be a case where it is desired to authenticate a license plate of a vehicle so as not to be known to the surrounding person. Thus, the wearable camera 1 may include a switch for turning on/off the output of the laser beam. When the switch is turned off, the control unit 19 of the wearable camera 1 does not output a laser beam from the laser L1 even after the mode shifts to the narrow-angle mode.

(Modification 6)

The user attached with the wearable camera 1 is not limited to police officer. The user attached with the wearable camera 1 may be a guard or the like.

Second Embodiment

In a second embodiment, the wearable camera 1 includes a plurality of microphones such that the sound of police officer attached with the wearable camera 1 can be distinguished from other sounds. The wearable camera 1 also adds tag information (meta information) to the recorded video data according to the sound of the police officer. Hereinafter, portions different from the first embodiment will be described.

Figure 9:
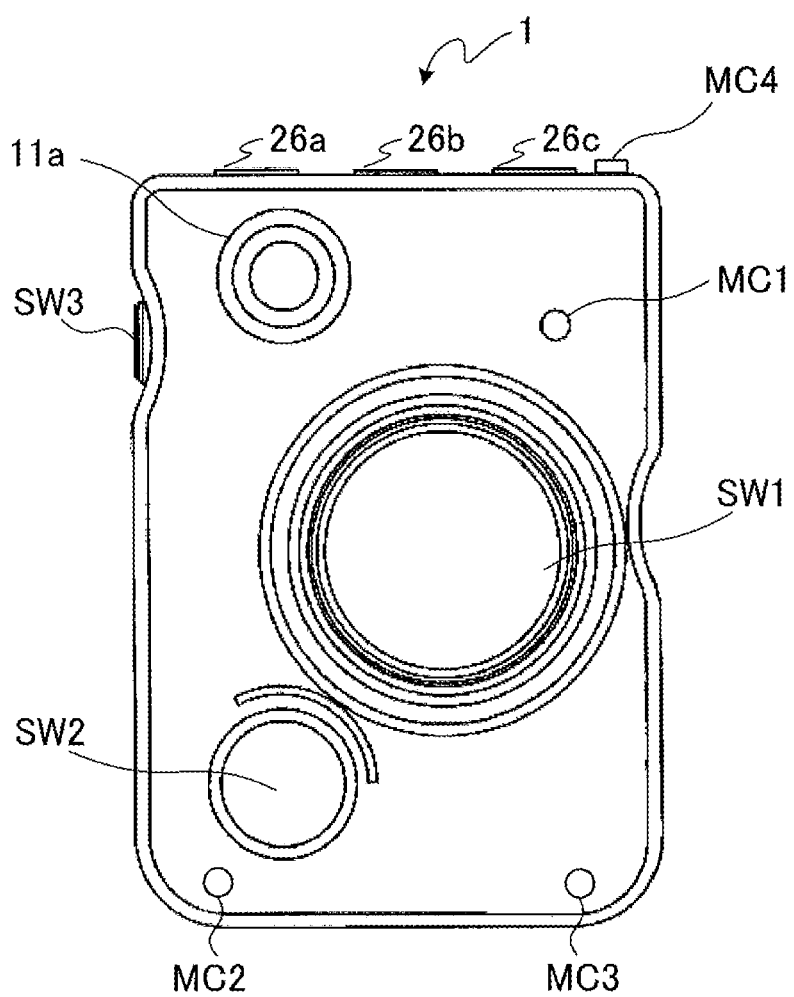
FIG. 9 is a view showing an appearance example of a wearable camera according to a second embodiment.

FIG. 9 is a view showing an appearance example of the wearable camera 1 according to the second embodiment. In FIG. 9, the same components as those in FIG. 3 are denoted by the same reference numerals. The wearable camera 1 shown in FIG. 9 has microphones MC2 to MC4 with respect to the wearable camera 1 shown in FIG. 3. The wearable camera 1 shown in FIG. 9 does not include the camera lens 11b and the laser L1 shown in FIG. 3.

The microphone MC1 is disposed on the front of the casing of the wearable camera 1 and above the center of the wearable camera 1. The microphone MC1 collects sound emitted by a speaker located facing the police officer attached with the wearable camera 1.

The microphones MC2, MC3 are disposed on the front of the casing of the wearable camera 1 and below the center of the wearable camera 1. The microphones MC2, MC3 are disposed at symmetrical positions on the front surface of the casing of the wearable camera 1. The microphones MC3, MC4 collect sounds other than sounds emitted by the opposite party of the police officer and the police officer. The microphones MC2, MC3 are also microphones for noise cancellation.

The microphone MC4 is disposed on the upper surface of the casing of the wearable camera 1. The MC4 collects sounds emitted by the police officer.

In the above description, the microphones MC2, MC3 are disposed on the front of the casing of the wearable camera 1, but the present invention is not limited thereto. Each of the microphones MC2, MC3 may be disposed on the left and right side surfaces of the casing of the wearable camera 1.

Figure 10:
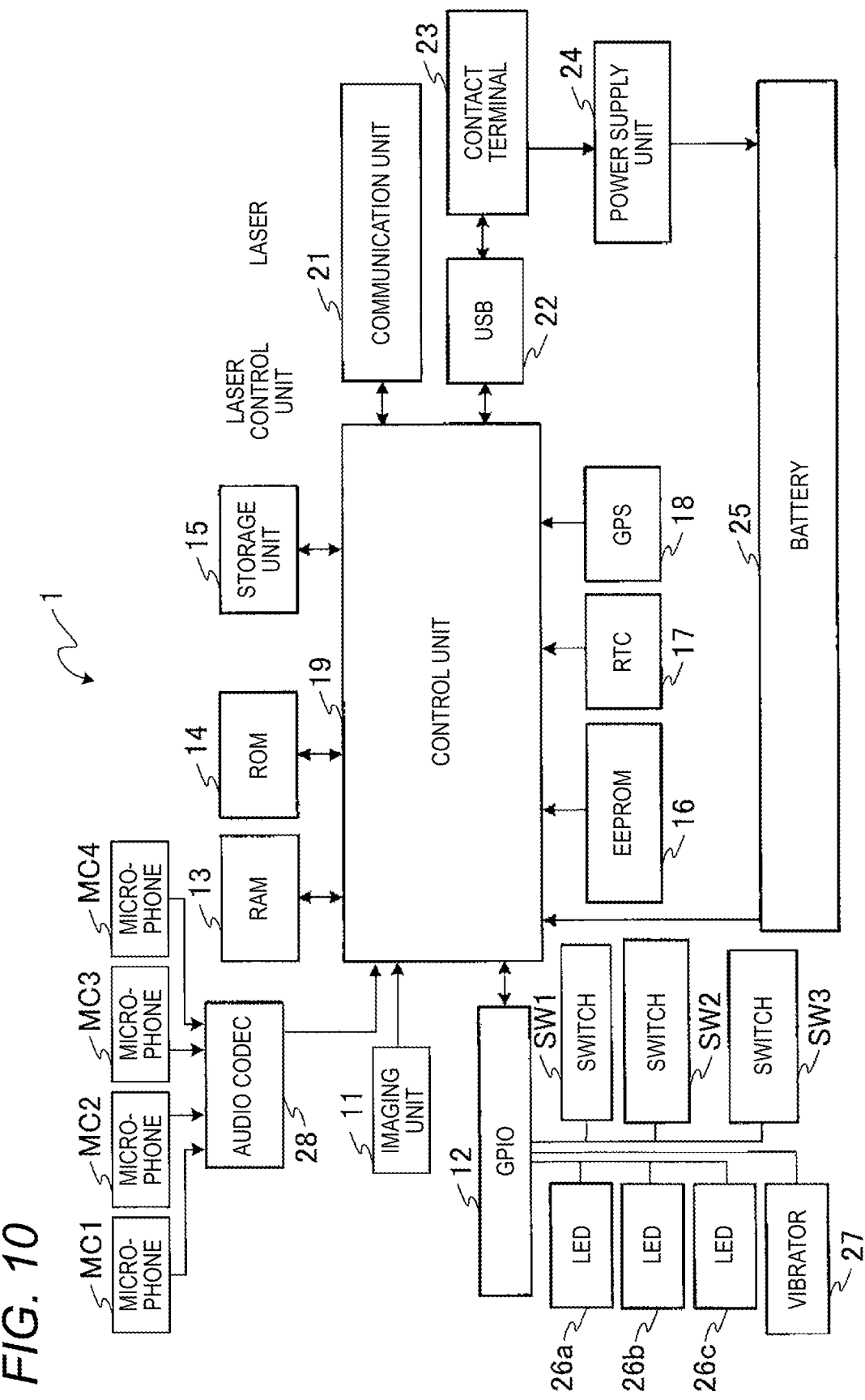
FIG. 10 is a view showing a block configuration example of the wearable camera in FIG. 9.

FIG. 10 is a view showing a block configuration example of the wearable camera 1 of FIG. 9. In FIG. 10, the same components as those in FIG. 5 are denoted by the same reference numerals. The wearable camera 1 shown in FIG. 10 has microphones MC2 to MC4 with respect to the block configuration of the wearable camera 1 shown in FIG. 5. The wearable camera 1 shown in FIG. 10 does not include a laser control unit 29 and a laser L1 shown in FIG. 3.

The audio codec 28 performs processing of emphasizing the sound of the police officer attached with the wearable camera 1. For example, the audio codec 28 subtracts the audio signals output from the microphones MC1 to MC3 from the audio signals output from the microphone MC4. As a result, an audio signal of the police officer, in which the sound of the opposite party and the surrounding sound are suppressed, is obtained.

The audio codec 28 encodes the audio signal of the microphone MC1 and outputs the encoded audio signal to the control unit 19. The audio codec 28 encodes the audio signals of the microphones MC2, MC 3 and outputs the encoded audio signals to the control unit 19. The audio codec 28 encodes the audio signal of the microphone MC4 subjected to the audio enhancement processing and outputs the encoded audio signal to the control unit 19. The control unit 19 may differentiate the audio data of the microphones MC1 to MC4 and include the audio date in the video data.

Here, for example, the police officer may reproduce a video imaged (recorded) by the wearable camera 1 on the terminal device 4, and create a report on a case based on the reproduced video. The video data may include, for example, a video portion not related to a case (report). If the video related to the case can be immediately reproduced by the terminal device 4, the report of the police officer can be easily created.

Thus, the control unit 19 of the wearable camera 1 adds attribute information to the video data stored in storage unit 15 based on the sound of the police officer attached with the wearable camera 1 such that the video portion related to the case can be reproduced by the terminal device 4. For example, the control unit 19 of the wearable camera 1 adds tag information to the video data from the sound of "case" emitted by the police officer to the sound of "stop" included in the video data. In this case, based on the tag information added to the video data, the terminal device 4 can reproduce the video from the sound "case" to the sound "stop".

Accordingly, when reproducing the video data recorded in the wearable camera 1, the terminal device 4 can reproduce the video data from a predetermined position by the tag information included in the video data. For example, the terminal device 4 can reproduce the video data from the position where the police officer emits "accident" to the position of "stop". Therefore, the police officer can reproduce a video related to a traffic accident from a place where a traffic accident has occurred or before and after the traffic accident, and thereby facilitating creation of a report related to the traffic accident.

The control unit 19 of the wearable camera 1 extracts a keyword prepared in advance from the sound of the police officer included in the video data stored in the storage unit 15 (sound collected by the microphone MC4). The keywords prepared in advance include, for example, cases such as "accident", "robbery", and "stop", and words related to the operation of the wearable camera 1. The control unit 19 of the wearable camera 1 extracts a keyword prepared in advance from the sound of the police officer included in the video data stored in the storage unit 15, and adds the tag information to the video data based on the extracted keyword. The keyword may be stored in, for example, the EEPROM 16. The keyword may be regarded as a word related to the imaging situation.

FIG. 11 is a flowchart showing an operation example of the wearable camera 1. When the switch SW1 is pressed during the recording of the video data and the recording of the video data ends, the control unit 19 of the wearable camera 1 executes the processing of the flowchart illustrated in FIG. 11.

The control unit 19 of the wearable camera 1 determines whether or not the tagging function by the sound of the microphone MC4 is turned on (step S11). For example, the wearable camera 1 includes a switch (not shown) for turning on/off a tagging function by the sound of microphone MC4. The control unit 19 of the wearable camera 1 determines whether or not the tagging function is turned on based on the on/off state of the switch of the tagging function by the sound of the microphone MC4.

When the control unit 19 of the wearable camera 1 turns off the tagging function by the sound of the microphone MC4 ("No" in S11), the processing ends.

On the other hand, when the control unit 19 of the wearable camera 1 determines whether or not the recorded video data includes the sound of "accident" (step S12) when turning on the tagging function by the sound of the microphone MC4 ("Yes" in S11).

When the recorded video data includes a sound of "accident" ("Yes" in S12), the control unit 19 of the wearable camera 1 determines whether or not the sound "stop" is included in the recorded video data (step S13).

When the control unit 19 of the wearable camera 1 determines that the recorded video data includes the sound "stop" ("Yes" in S13), the control unit 19 of the wearable camera 1 adds the tag information "accident" to the video from "accident" to "stop" of the recorded video data (step S14). That is, the control unit 19 of the wearable camera 1 adds the tag information to the video from the "accident" to the "stop" of the recorded video data as the video related to the "accident".

On the other hand, when the control unit 19 of the wearable camera 1 determines that the recorded video data does not include the sound "stop" ("No" in S13), the control unit 19 of the wearable camera 1 clips a video for a predetermined time from the sound portion of the "accident" of the recorded video data, and adds the tag information "accident" to the clipped video (step S15). That is, when the recorded video data does not include the sound "stop", the control unit 19 of the wearable camera 1 adds the tag information as the video related to the "accident" from the sound portion of the "accident" of the recorded video data. For example, the control unit 19 of the wearable camera 1 clips video data for 10 minutes from the sound portion of "accident" included in the recorded video data, and adds tag information "accident".

When it is determined in step S12 that the recorded video data does not include the sound of "accident" ("No" in S12), the control unit 19 of the wearable camera 1 determines whether or not the recorded video data includes the sound of "robbery" (step S16).

When the recorded video data includes a sound of "robbery" ("Yes" in S16), the control unit 19 of the wearable camera 1 determines whether or not the sound "stop" is included in the recorded video data (step S17).

When it is determined that the recorded video data includes the sound "stop" ("Yes" in S17), the control unit 19 of the wearable camera 1 adds tag information "robbery" to the video from "robbery" to "stop" of the recorded video data (step S18). That is, the control unit 19 of the wearable camera 1 adds the tag information from "robbery" to "stop" of the recorded video data as a video related to "robbery".

On the other hand, when it is determined that the recorded video data does not include the sound "stop" ("No" in S17), the control unit 19 of the wearable camera 1 clips a video for a predetermined time from the sound portion of "robbery" of the recorded video data, and adds tag information of "robbery" to the clipped video (step S19). That is, when the recorded video data does not include the sound "stop", the control unit 19 of the wearable camera 1 adds the tag information to the video clipped for a predetermined time from the sound portion of the "robbery" of the recorded video data as a video related to "robbery". For example, the control unit 19 of the wearable camera 1 clips video data for 10 minutes from the sound portion of "robbery" included in the recorded video data, and adds tag information "robbery".

When it is determined in step S16 that the recorded video data does not include the sound of "robbery" ("No" in S16), the control unit 19 of the wearable camera 1 determines whether or not a previously prepared keyword is included in the recorded video data, as in the processing of steps S12, S16. The control unit 19 of the wearable camera 1 executes keyword extraction processing and tag information adding processing until the recorded video data ends (step S20).

When the processing of the flowchart in FIG. 11 ends, the control unit 19 of the wearable camera 1 transmits the video data to which the tag information has been added to the in-vehicle system 2.

Further, in steps S15, S19, the video data is clipped for a predetermined time when the sound "stop" is not included in the video data, but the present invention is not limited thereto. When the video data does not include the sound "stop", the control unit 19 of the wearable camera 1 may not add tag information to the recorded video data.

The control unit 19 of the wearable camera 1 may associate the tag information with the time of the video data and add the tag information to the video data. For example, when the police officer emits "accident" in the recorded video, the control unit 19 of the wearable camera 1 may associate the time in the video data in which the police officer emits "accident" with the tag information "accident". In this case, for example, when the police officer searches for the tag information "accident" by using the terminal device 4, the terminal device 4 can reproduce the video data from the time in the video in which the "accident" is emitted.

In addition, the keyword may include words corresponding to various situations. That is, the keyword may include various sounds of police officers (words emitted by police officers). The control unit 19 of the wearable camera 1 may add the tag information corresponding to various situations to the video data. For example, the keyword may include a word that restrains a suspect such as "stopped". In this case, when the police officer creates a report by using the terminal device 4, it is possible to reproduce the video from a place where "stopped" is issued to the suspect.

As described above, the imaging unit 11, the storage unit 15 for storing the video data imaged by the imaging unit 11, and the microphone MC 4 for collecting the sound of the police officer attached with the wearable camera 1 and disposed on an upper surface of the casing, and the control unit 19 that extracts the sound of a user related to an imaging situation included in the video data, and adds the attribute information to the video data based on the extracted sound. As described above, since the microphone MC4 for collecting the sound of the police officer is provided on the upper surface of the casing of the wearable camera 1, it is easy to collect the sound of the police officer. Therefore, the wearable camera 1 can appropriately add attribute information to the video data based on, for example, the sound of the police officer attached with the wearable camera 1, instead of the sound of a speaker located facing the police officer.

(Modification 1)

The wearable camera 1 shown in FIGS. 9 and 10 may include the camera lens 11b, the laser control unit 29, and the laser L1 described in the first embodiment. The wearable camera 1 shown in FIGS. 9 and 10 may have imaging modes including the wide-angle mode and the narrow-angle mode described in the first embodiment.

(Modification 2)

When the control unit 19 of the wearable camera 1 has a function that allows the wearable camera 1 to record not only the video data but also the sound data, the control unit 19 of the wearable camera 1 may add the tag information to the sound data.

Each functional block used in the description of the above embodiments is typically implemented as an LSI which is an integrated circuit. These may be individually integrated into one chip, or may be integrated into one chip so as to include some or all of them. Here, although the LSI is used, it may be referred to as an IC, a system LSI, a super LSI, or an ultra LSI depending on the degree of integration.

The method of circuit integration is not limited to LSI, and may be implemented by a dedicated circuit or a general-purpose processor. After manufacturing the LSI, field programmable gate array (FPGA) that can be programmed, or a reconfigurable processor that can reconfigure connections and settings of circuit cells inside the LSI may be used.

Further, if an integrated circuit technology that replaces the LSI appears due to the progress of the semiconductor technology or another technology derived therefrom, the functional blocks may be naturally integrated using the technology. Application of biotechnology or the like may be possible.

INDUSTRIAL APPLICABILITY

The present disclosure is useful, for example, in a wearable camera attached to a police officer to perform imaging.

REFERENCE SIGNS LIST

1 Wearable camera
2 In-vehicle system
3 Server
4 Terminal device
11 Imaging unit
11a, 11b Camera lens
12 GPIO
13 RAM
14 ROM
15 Storage unit
16 EEPROM
17 RTC
18 GPS
19 Control unit
21 Communication unit
22 USB
23 Contact terminal
24 Power supply unit
25 Battery
26a, 26b, 26c LED
27 Vibrator
28 Audio codec
29 Laser control unit
SW1 to SW3 Switch
MC1 to MC4 Microphone
L1 Laser
A1 Police vehicle
A2 Police station

What is claimed is:

1. A wearable camera comprising:
an imaging unit configured to generate video data;
a memory configured to store the video data and a plurality of keywords;
a microphone disposed on an upper surface of a casing and configured to collect sounds of a user; and
a processor configured to:
determine whether or not a first keyword of the plurality of keywords is included in the collected sounds of the user;
determine, in response to determining the first keyword is included in the collected sounds of the user, whether or not a second keyword of the plurality of keywords is included in the collected sounds of the user; and
add, in response to determining the second keyword is included in the collected sounds of the user, tag information to a portion of the video data that starts based on the first keyword and ends based on the second keyword, the tag information indicating the first keyword.

2. The wearable camera according to claim 1, further comprising:
another microphone disposed on a front surface of the casing and configured to collect sounds around the wearable camera.

3. The wearable camera according to claim 2, further comprising:
a plurality of microphones configured to collect sounds around the wearable camera.

4. The wearable camera according to claim 3, wherein
at least two of the plurality of microphones are disposed at symmetrical positions on the front surface of the casing and below a center of the wearable camera.

5. The wearable camera according to claim 3, wherein
at least one of the plurality of microphones is disposed on the front surface of the casing and above a center of the wearable camera.

6. The wearable camera according to claim 2, wherein
the processor is configured to extract a surrounding sound from the another microphone, and adds the extracted surrounding sound to the video data.

7. The wearable camera according to claim 6, further comprising:
a plurality of microphones configured to collect sounds around the wearable camera,
wherein the processor distinguishes a surrounding sound from the plurality of microphones, and add the distinguished surrounding sound to the video data.

8. The wearable camera according to claim 1, further comprising:
another microphone disposed on a front surface of the casing or a side surface of the casing and configured to collect sounds used for cancelling noise from a signal output from the microphone.

9. The wearable camera according to claim 1, wherein the processor is configured to add, in response to determining the second keyword is not included in the collected sounds of the user, the tag information to a portion of the video data that starts based on the first keyword and ends at a predetermined time.

10. The wearable camera according to claim 1, wherein the processor is configured to:
determine whether or not a third keyword of the plurality of keywords is included in the collected sounds of the user;
determine, in response to determining the third keyword is included in the collected sounds of the user, whether or not a fourth keyword of the plurality of keywords is included in the collected sounds of the user; and
add, in response to determining the fourth keyword is included in the collected sounds of the user, tag information to another portion of the video data that starts based on the third keyword and ends based on the fourth keyword, the tag information indicating the third keyword.

11. The wearable camera according to claim 10, wherein the first keyword and the third keyword are different from each other, and the second keyword and the fourth keyword are the same.

12. A method comprising:
generating, by an imaging unit, video data;
collecting, by a microphone, sounds of a user;
determining, by a processor, whether or not a first keyword is included in the collected sounds of the user;
determining, by the processor and in response to determining the first keyword is included in the collected sounds of the user, whether or not a second keyword is included in the collected sounds of the user, and
adding, by the processor and in response to determining the second keyword is included in the collected sounds of the user, tag information to a portion of the video data that starts based on the first keyword and ends based on the second keyword, the tag information indicating the first keyword.

* * * * *